(12) United States Patent
Song

(10) Patent No.: US 11,345,408 B2
(45) Date of Patent: May 31, 2022

(54) BODY REINFORCING APPARATUS FOR VEHICLE

(71) Applicants: HYUNDAI MOTOR COMPANY, Seoul (KR); KIA MOTORS CORPORATION, Seoul (KR)

(72) Inventor: Won Ki Song, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/032,864

(22) Filed: Sep. 25, 2020

(65) Prior Publication Data

US 2021/0309298 A1    Oct. 7, 2021

(30) Foreign Application Priority Data

Apr. 6, 2020 (KR) .................. 10-2020-0041642

(51) Int. Cl.
| | |
|---|---|
| *B62D 25/02* | (2006.01) |
| *B62D 25/04* | (2006.01) |
| *B62D 29/00* | (2006.01) |
| *B33Y 80/00* | (2015.01) |
| *B62D 27/02* | (2006.01) |
| *B62D 27/06* | (2006.01) |
| *B60J 10/84* | (2016.01) |

(52) U.S. Cl.
CPC .............. *B62D 25/04* (2013.01); *B60J 10/84* (2016.02); *B62D 25/02* (2013.01); *B62D 27/06* (2013.01); *B62D 29/001* (2013.01); *B33Y 80/00* (2014.12)

(58) Field of Classification Search
CPC ...... B62D 25/02; B62D 25/04; B62D 29/001; B62D 29/004; B62D 27/02; B62D 27/023; B33Y 80/00
USPC ............. 296/29, 30, 193.06, 203.01, 203.04, 296/203.02
See application file for complete search history.

(56) References Cited

U.S. PATENT DOCUMENTS

| | | | |
|---|---|---|---|
| 9,227,673 B2 | 1/2016 | Berger et al. | |
| 9,884,663 B2 * | 2/2018 | Czinger | B62D 65/02 |
| 2005/0035628 A1 | 2/2005 | Behr et al. | |
| 2020/0016830 A1 * | 1/2020 | Huff | B33Y 40/00 |

FOREIGN PATENT DOCUMENTS

| | | | |
|---|---|---|---|
| DE | 202017105474 | * | 1/2019 |
| EP | 3782879 | * | 2/2021 |
| JP | H09-066799 A | | 3/1997 |

(Continued)

*Primary Examiner* — Dennis H Pedder
(74) *Attorney, Agent, or Firm* — Lempia Summerfield Katz LLC

(57) ABSTRACT

A body reinforcing apparatus for a vehicle is provided at a junction where multiple body members are gathered together and connected to each other to couple the body members. In particular, the body reinforcing apparatus includes: a reinforcing body formed in a 3D-truss structure by a 3D-printing process, and having a plurality of extended portions extended toward the body members; and a fastening member integrally formed with an end of each of the extended portions by inserting the fastening member during the 3D printing process, and having a first end inserted in the extended portion and integrated with the extended portion, and a second end fastened to each of the body members.

14 Claims, 9 Drawing Sheets

(56) References Cited

FOREIGN PATENT DOCUMENTS

| | | |
|---|---|---|
| JP | H11-180338 A | 7/1999 |
| JP | 2004-502599 A | 1/2004 |
| KR | 20-1998-0007890 U | 4/1998 |
| KR | 10-1689575 B1 | 12/2016 |
| KR | 10-1738039 B1 | 5/2017 |
| WO | 02-004276 A1 | 1/2002 |

* cited by examiner

BODY REINFORCING APPARATUS FOR VEHICLE

CROSS REFERENCE TO RELATED APPLICATION

The present application claims priority to and the benefit of Korean Patent Application No. 10-2020-0041642, filed Apr. 6, 2020, the entire contents of which are incorporated herein by reference.

FIELD

The present disclosure relates to a body reinforcing apparatus for a vehicle.

BACKGROUND

The statements in this section merely provide background information related to the present disclosure and may not constitute prior art.

In general, a vehicle is generally divided into a body and a chassis. The body forms the external appearance of the vehicle, and the chassis includes main mechanical apparatuses desired for driving the vehicle.

Pillars are installed at the edges of front doors and rear doors arranged at opposite sides of the body to support the front doors and the rear doors. The pillars form the overall shape of the body, and maintain rigidity of the sides of the body.

The pillars are largely divided into a front pillar that is disposed in the front-rear direction of a vehicle at a predetermined angle so as to support the front door in contact with the rear end of an engine room at the front of the body, a center pillar that is disposed vertically between the front door and the rear door and supports the front door and the rear door and the side of the body open by the door, and a rear pillar that is coupled to the rear end of the rear door and supports the rear door and the rear of the body.

The pillars of the vehicle are equipped with a reinforcing apparatus that increases rigidity of the body in connection to the lower side of the body.

Conventionally, a reinforcing apparatus is made of a material such as steel or aluminum.

The foregoing is intended merely to aid in the understanding of the background of the present disclosure, and is not intended to mean that the present disclosure falls within the purview of the related art that is already known to those skilled in the art.

SUMMARY

The present disclosure improves rigidity of a body of a vehicle by manufacturing a reinforcing body in a 3D-truss structure with a 3D-printer. In addition, the reinforcing body improves the rigidity of the body by connecting a plurality of body members extended from the body.

In one form of the present disclosure, a body reinforcing apparatus for a vehicle is provided at a junction where a plurality of body members are gathered together and connected to each other and configured to perform coupling between the body members, the body reinforcing apparatus including: a reinforcing body formed in a 3D-truss structure by means of 3D-printing, and having a plurality of extended portions extended toward the body members; and a fastening member integrally formed with an end of each of the extended portions by inserting the fastening member in a 3D printing process, and having a first end inserted in the extended portion and integrated with the extended portion and a second end fastened to each of the body members.

The fastening member may have a hollow pillar shape, and may be configured such that the first end is inserted in and integrated with the extended portion of the reinforcing body by means of 3D printing, and the second end is fastened to the body member in an insertion manner.

The first end of the fastening member may be inserted in the extended portion, and the extended portion may be integrated with the first end of the fastening member while surrounding an outer peripheral surface of the first end of the fastening member.

The body reinforcing apparatus may further include: a coupling part integrally formed with the reinforcing body by inserting the coupling part in the 3D printing process, and coupled to an inner panel on a door matching flange side of the body, in surface contact with the inner panel.

The coupling part may include a first stepped portion formed such that an end of the coupling part is stepped in a predetermined section and with which the inner panel is in surface contact, and an end of the inner panel may have a second stepped portion formed to correspond to the first stepped portion so that an assembly position of the inner panel and the coupling part may be restricted by surface contact between the first stepped portion and the second stepped portion.

The body reinforcing apparatus may further include: a weatherstrip sealing the door matching flange side of the body, wherein the weatherstrip may be connected to the inner panel and the coupling part.

The reinforcing body may be provided as plurality of reinforcing bodies so that the respective reinforcing bodies may be coupled to opposite sides of the body, and the body members may include a cross member connecting the reinforcing bodies at opposite sides of the vehicle to each other.

The body reinforcing apparatus may further include: a fastening part integrally formed with the reinforcing body by inserting the fastening part in the 3D printing process, and to which the cross member is inserted so that the cross member may be coupled to the reinforcing bodies at the opposite sides of the body.

The body members may have an extension member branched and extended toward the reinforcing body, and the extension member may have an extended end fastened to the fastening member and coupled to the reinforcing body.

The body members may be composed of an upper member extended from an upper side of the body toward the reinforcing body, and a lower member extended from a lower side of the body toward the reinforcing body.

The fastening member may include: an upper fastening member fastened to an upper member; and a lower fastening member fastened to a lower member.

The 3D-truss structure may be a structure in which a plurality of points are connected to each other by a plurality of segments.

The 3D-truss structure may be configured such that a length of each of the segments connecting the plurality of points is equal to or less than 10 mm, and a diameter of the segment is equal to or less than 3 mm.

The reinforcing body may be configured such that a surface and an inside thereof are formed in the 3D-truss structure connecting the plurality of points with the plurality of segments.

The reinforcing body may be applied to a rear pillar of the body.

The body reinforcing apparatus for the vehicle according to the present disclosure is provided with the reinforcing body connecting a plurality of members extended from the body, thereby having an effect of achieving improved rigidity of the body.

Further, the reinforcing body is manufactured in a 3D-truss structure with a 3D-printer, thereby having an effect of achieving reduced weight and improved rigidity.

Further, the 3D-truss structure is a structure in which the plurality of points are connected to each other by the plurality of segments, thereby providing an effect that the reinforcing body can be applied to the position of the body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
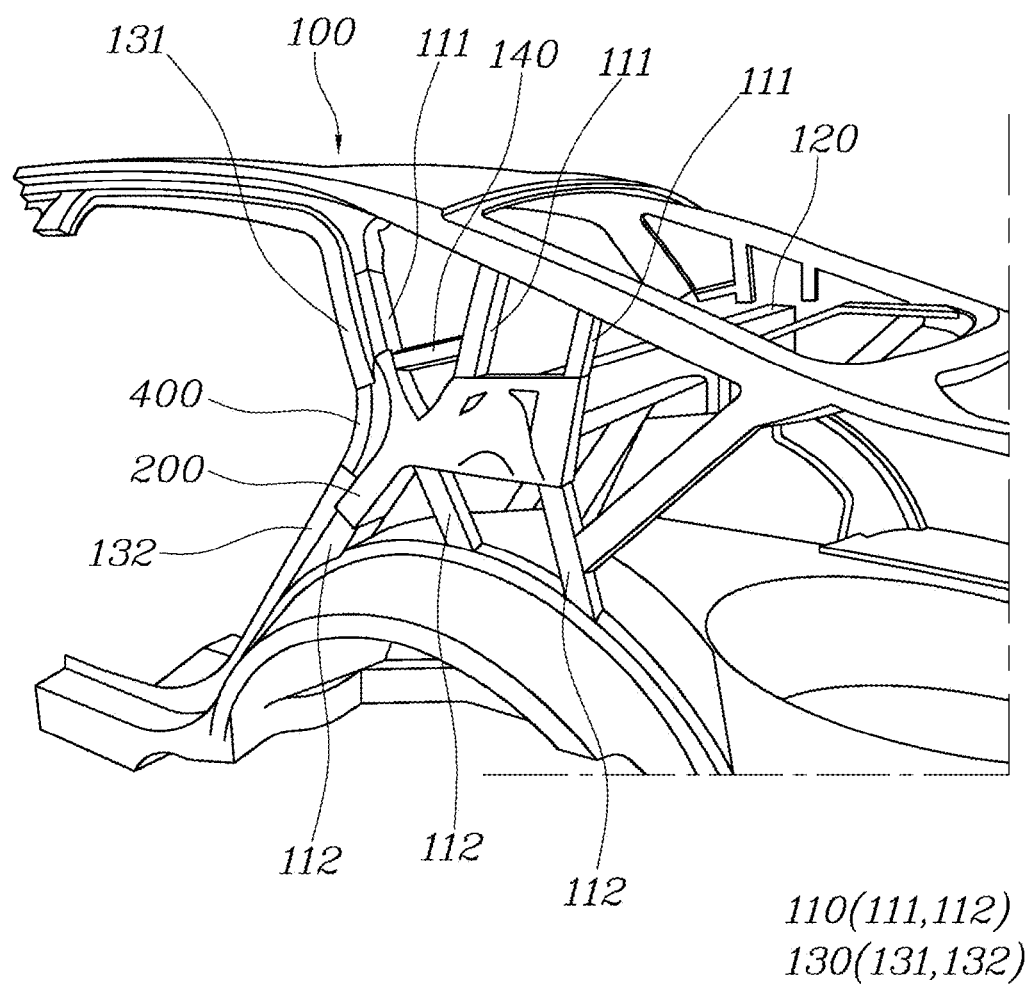
FIG. 1 is a perspective view illustrating a body reinforcing apparatus for a vehicle as seen from the outside of a body.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be embodied in many different forms without departing from the spirit and significant characteristics of the present disclosure. Therefore, the forms of the present disclosure are disclosed only for illustrative purposes and should not be construed as limiting the present disclosure.

Reference will now be made in detail to various forms of the present disclosure, specific examples of which are illustrated in the accompanying drawings and described below, since the forms of the present disclosure can be variously modified in many different forms. On the contrary, the present disclosure is intended to cover not only the exemplary forms, but also various alternatives, modifications, equivalents and other forms that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
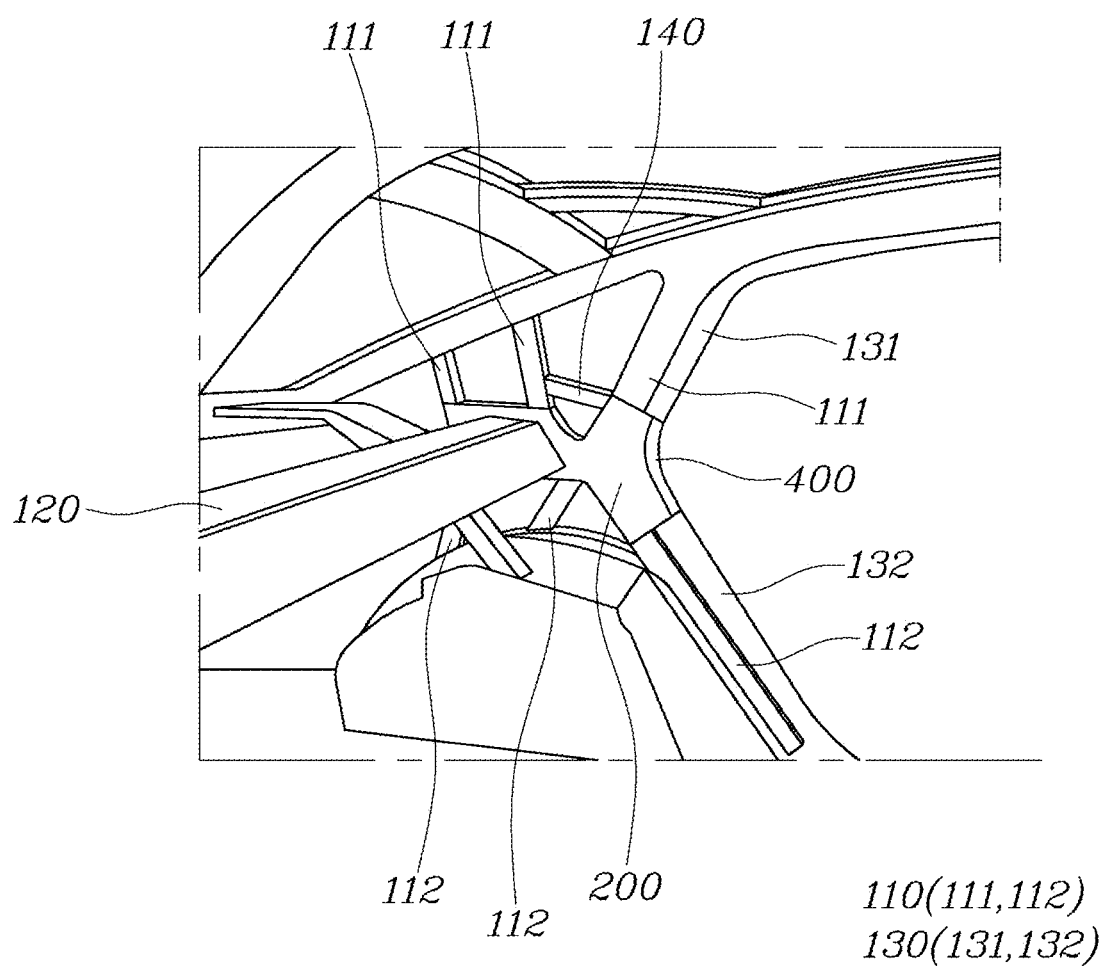
FIG. 2 is a perspective view illustrating the body reinforcing apparatus as seen from the inside of the body.
Figure 3:
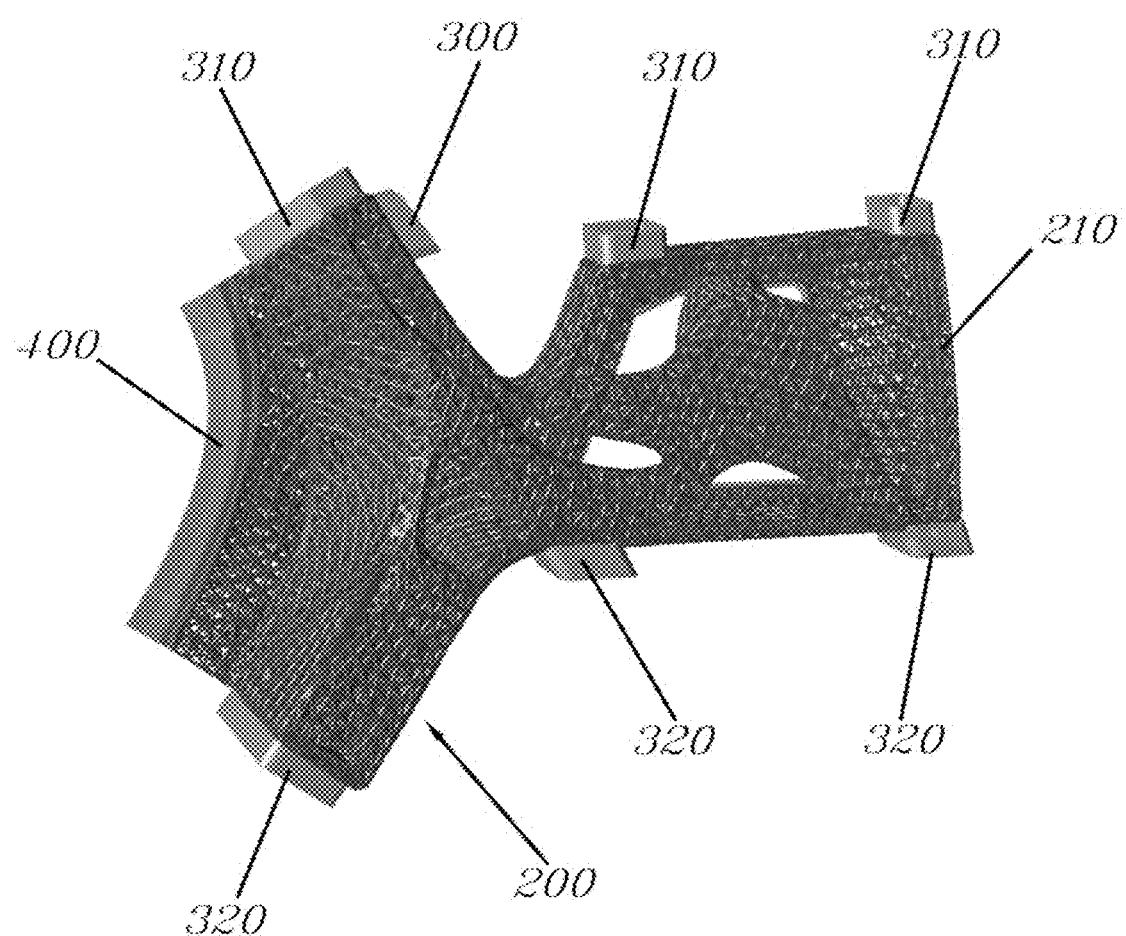
FIG. 3 is an outer perspective view illustrating a reinforcing body of the body reinforcing apparatus.
Figure 4:
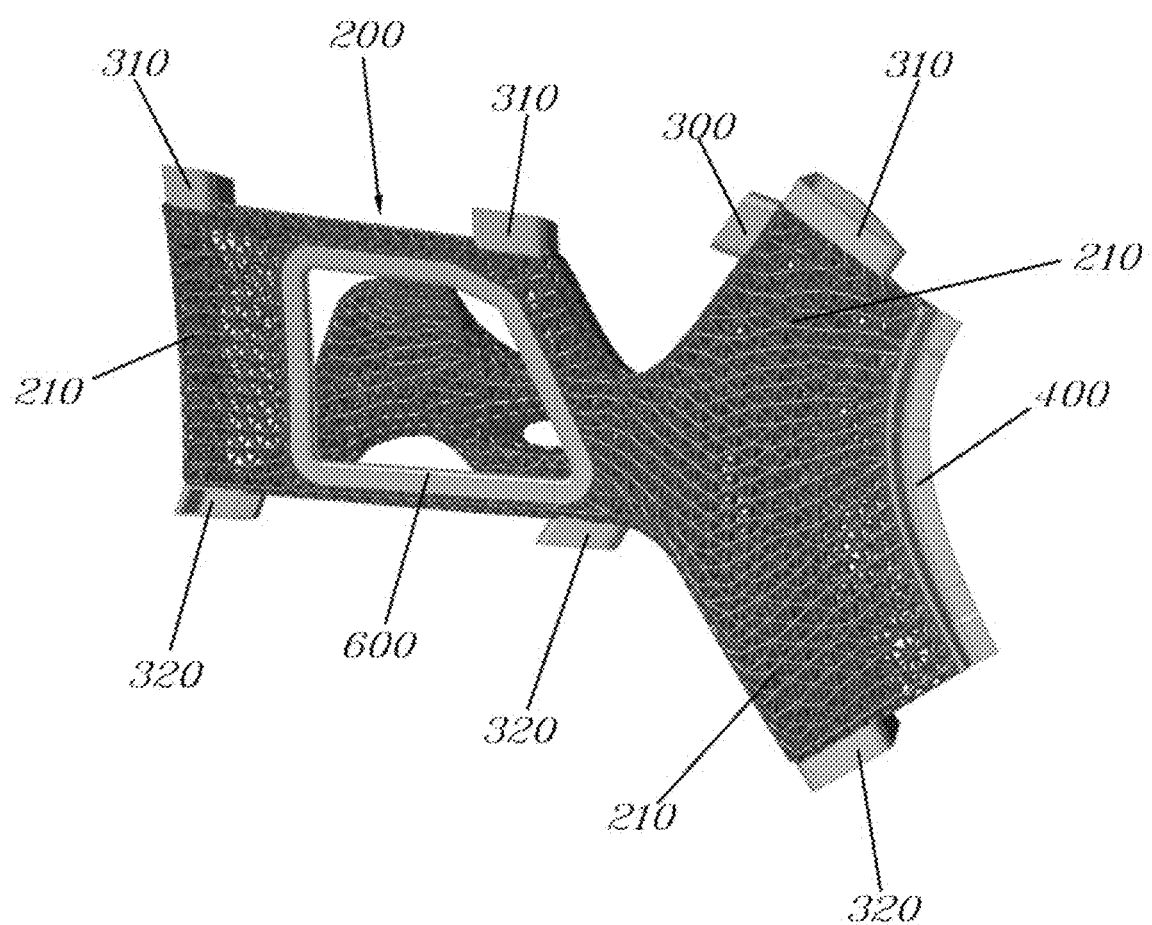
FIG. 4 is an inner perspective view illustrating the reinforcing body of the body reinforcing apparatus.
Figure 5:
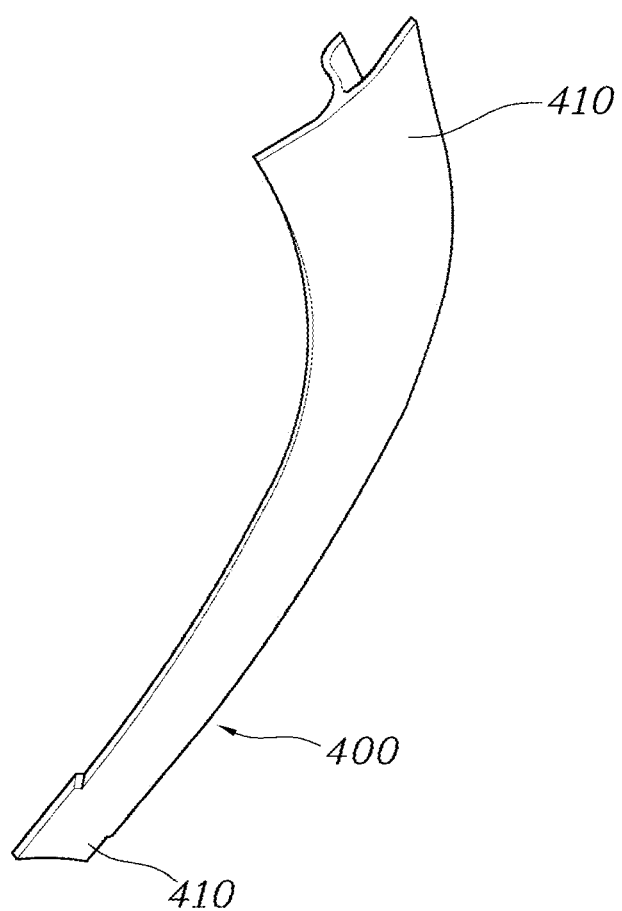
FIG. 5 is a perspective view illustrating a coupling part of the body reinforcing apparatus.
Figure 6:
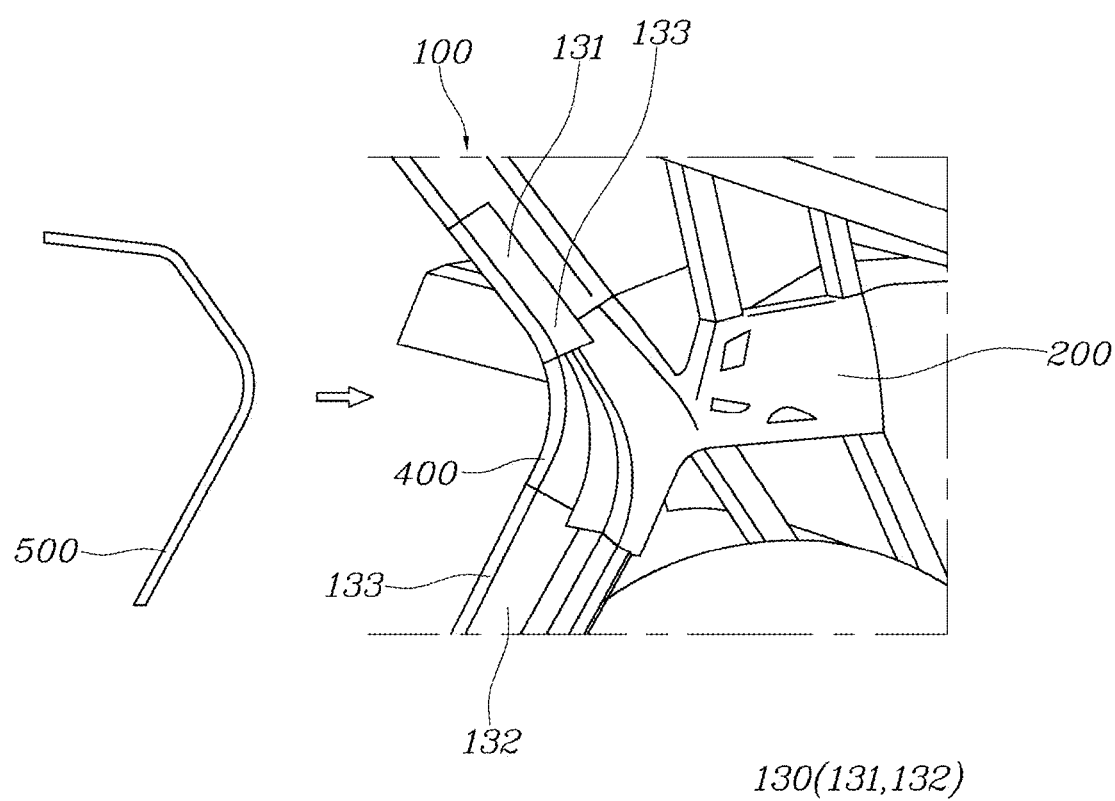
FIG. 6 is a view illustrating that a weatherstrip is coupled to an inner panel and the coupling part of the body reinforcing apparatus.
Figure 7:
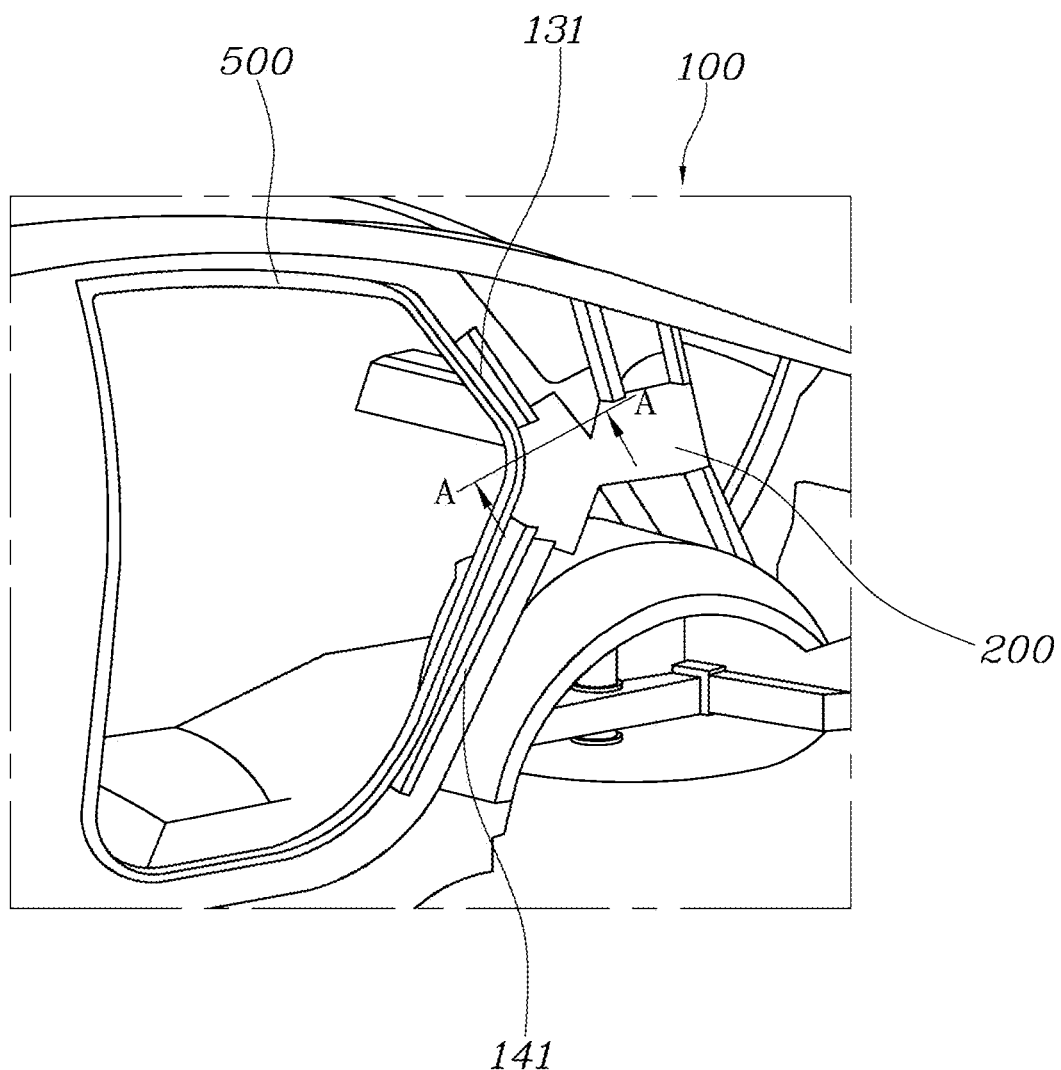
FIG. 7 is a view illustrating a state after the weatherstrip is coupled to the inner panel and the coupling part of the body reinforcing apparatus.
Figure 8:
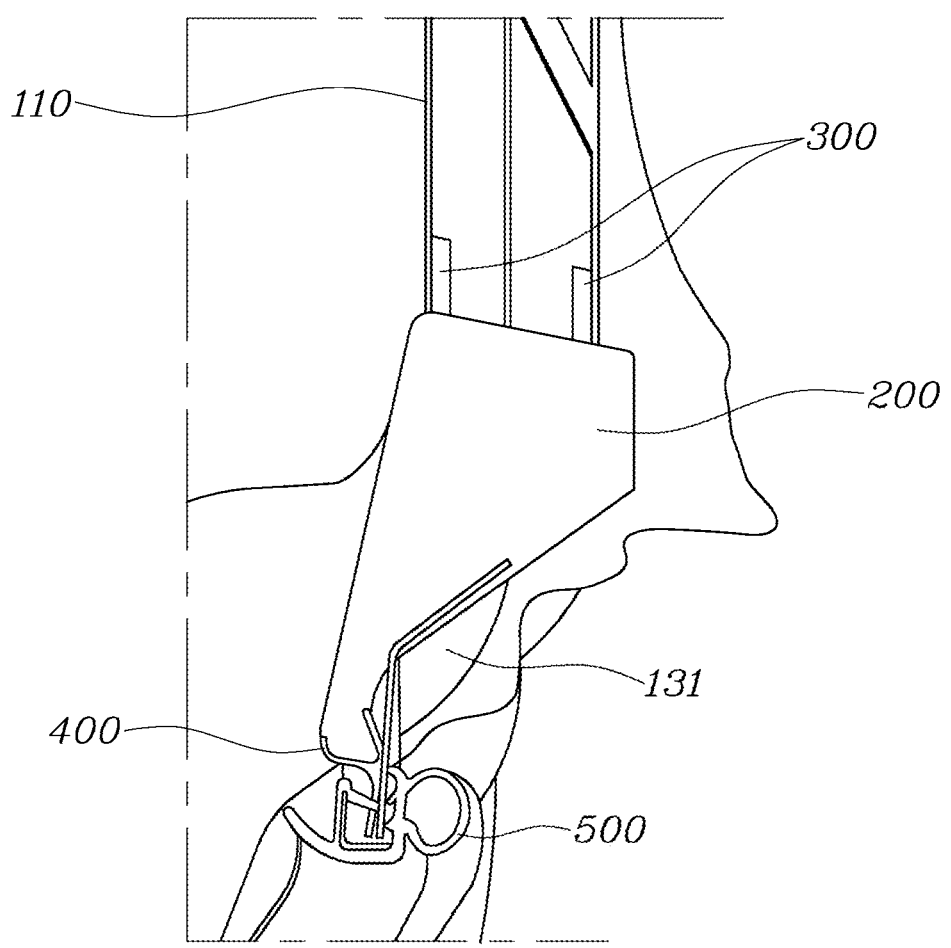
FIG. 8 is a sectional view taken along line A-A in FIG. 7.
Figure 9:
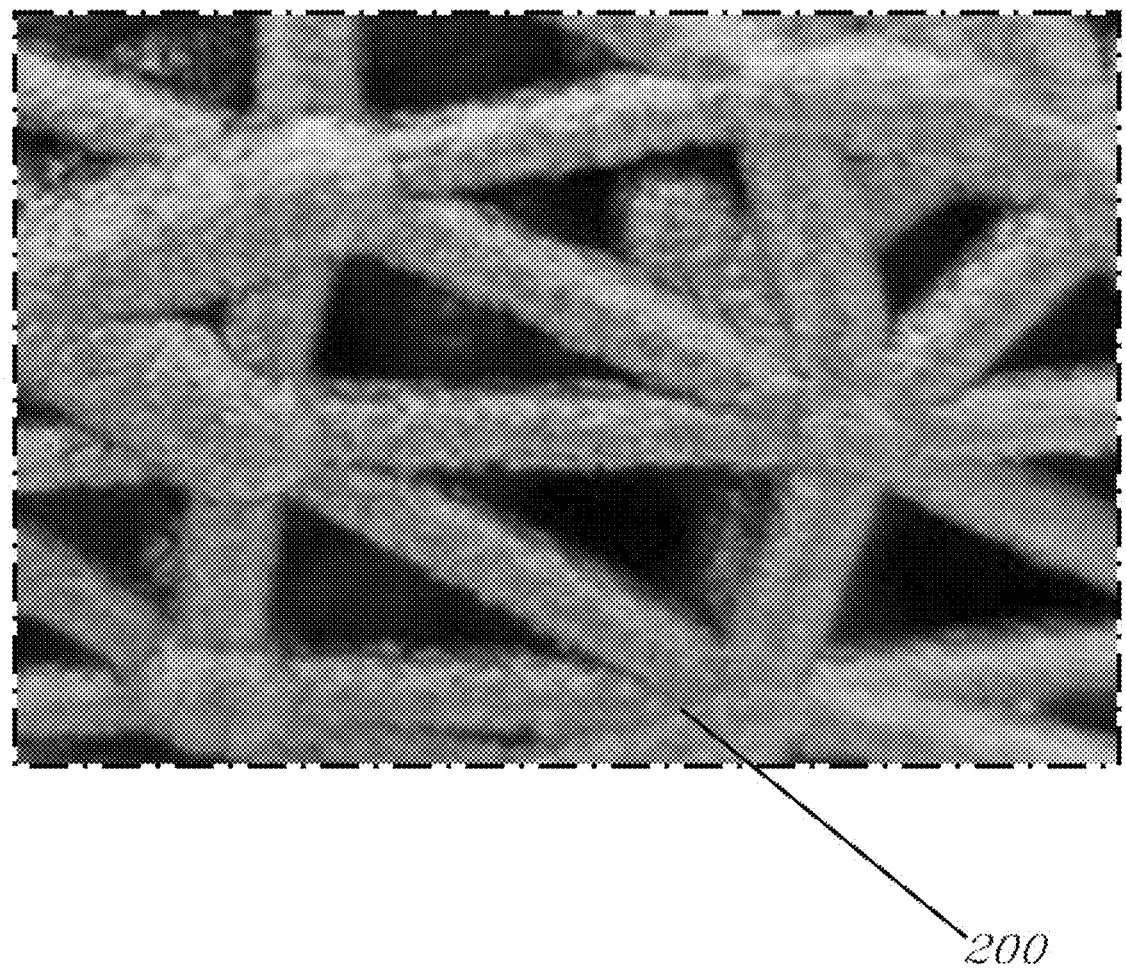
FIG. 9 is an enlarged view illustrating a 3D-truss structure of the reinforcing body of the body reinforcing apparatus.

FIG. 1 is a perspective view illustrating a body reinforcing apparatus for a vehicle as seen from the outside of the body 100 in one form of the present disclosure, FIG. 2 is a perspective view illustrating the body reinforcing apparatus for the vehicle as seen from the inside of the body 100 in one form of the present disclosure, FIG. 3 is an outer perspective view illustrating a reinforcing body 200 of the body reinforcing apparatus for the vehicle according to one form of the present disclosure, FIG. 4 is an inner perspective view illustrating the reinforcing body 200 of the body reinforcing apparatus for the vehicle according to one form of the present disclosure, FIG. 5 is a perspective view illustrating a coupling part 400 of the body reinforcing apparatus for the vehicle according to one form of the present disclosure, FIG. 6 is a view illustrating that a weatherstrip 500 is coupled to an inner panel 130 and the coupling part 400 of the body reinforcing apparatus for the vehicle in one form of the present disclosure, FIG. 7 is a view illustrating a state after the weatherstrip 500 is coupled to the inner panel 130 and the coupling part 400 of the body reinforcing apparatus for the vehicle according to one form of the present disclosure, FIG. 8 is a sectional view taken along line A-A in FIG. 7, and FIG. 9 is an enlarged view illustrating a 3D-truss structure of the reinforcing body 200 of the body reinforcing apparatus for the vehicle in some forms of the present disclosure.

Hereinafter, the body reinforcing apparatus for the vehicle according to an exemplary form of the present disclosure will be described with reference to the accompanying FIGS. 1 to 9.

The body reinforcing apparatus for the vehicle according to the present disclosure is an apparatus for improving rigidity of the body 100 by coupling a plurality of body members 110 formed extended from a frame of the body 100 to reinforce the body 100.

The body reinforcing apparatus for the vehicle according to one form of the present disclosure is an apparatus that is mounted to reinforce a rear pillar of the vehicle, and may be mounted to the vehicle to reinforce a front pillar rather than the rear pillar or the body reinforcing apparatus rather than the above.

In one form, the body reinforcing apparatus is provided at a junction where multiple body members 110 are gathered together and connected to each other to couple the body members 110. In particular, the body reinforcing apparatus is formed in a 3D-truss structure by means of 3D-printing process. The body reinforcing apparatus for the vehicle includes: at least one reinforcing body 200 having a plurality of extended portions 210 extended toward the body members 110; and a fastening member 300 integrally formed with the end of each of the extended portions 210 by inserting the fastening member 300 in a 3D printing process, and having a first end inserted in and integrated with the extended portion 210 and a second end fastened to each of the body members 110.

Referring further to FIGS. 1 to 4, to improve rigidity of the body 100, the body members 110 extended from the body 100 are formed, and the reinforcing body 200 for coupling the body members 110 is formed. The reinforcing body 200 may be manufactured with a 3D-printer, and the shape of the reinforcing body 200 may be formed in a 3D-truss structure to further improve rigidity compared to a conventional reinforcing body. Further, the reinforcing body 200 has an effect of enabling a reduced weight compared to the conventional reinforcing body because the conventional reinforcing body is made of a material such as steel or aluminum. Furthermore, when the reinforcing body 200 is manufactured simultaneously with parts other than the reinforcing body 200 during one printing at the time of manufacturing with a 3D-printer, there is an effect of reducing manufacturing cost.

Moreover, since the reinforcing body 200 is manufactured in a 3D-truss structure, there is an effect that the reinforcing body 200 is applicable to other positions of the body 100 to reinforce the body 100, in addition to reinforcing of the rear pillar applied in one form of the present disclosure.

To couple the reinforcing body 200 and the body members 110, the extended portions 210 formed extended from the reinforcing body 200 are provided, and each of the extended portions 210 is provided with the fastening member 300 having the first end inserted in and integrated with the extended portion 210.

The fastening member 300 may be extended in the direction in which each of the body members 110 extends and coupled to the body member 110. In one form of the present disclosure, the fastening member 300 may be coupled by insertion into the body member 110, but is not limited thereto. For example, the body member 110 may be inserted into the fastening member 300, or the body member 110 and the fastening member 300 may be coupled to each other by welding or by other methods.

The body member 110 may be manufactured in a shape of a hollow shaft, but is not limited thereto. For example, in order to improve rigidity, the body member 110 may be manufactured in a structure in which a rib having a grid cross-sectional shape is formed.

The fastening member 300 has a hollow pillar shape, and is configured such that the first end is inserted in and integrated with the extended portion 210 of the reinforcing body 200 by means of 3D printing, and the second end is fastened to the body member 110 in an insertion manner.

Referring further to FIGS. 3 to 4, the fastening member 300 may be inserted into a 3D-printer before 3D printing of the reinforcing body 200 with the 3D-printer, and then the reinforcing body 200 may be 3D-printed, thereby manufacturing the reinforcing body 200 with the fastening member 300 inserted in the reinforcing body 200.

This makes it possible that the reinforcing body 200 and the fastening member 300 can be manufactured integrally so that a very firm connection can be formed. Further, a separate process for coupling the reinforcing body 200 and the fastening member 300 is not additionally required, and thus there is an effect of a reduced number of manufacturing processes.

The first end of the fastening member 300 is inserted in the extended portion 210, and the extended portion 210 is integrated with the first end of the fastening member 300 while surrounding the outer peripheral surface of the first end of the fastening member 300.

When the reinforcing body 200 is manufactured, the first end of the fastening member 300 is positioned to be inserted in the extended portion 210 of the reinforcing body 200, and the extended portion 210 is formed while surrounding the fastening member 300. Thus, there is an effect that a very firm connection can be famed between the fastening member 300 the extended portion 210.

The present disclosure further includes the coupling part 400 integrally formed with the reinforcing body 200 by inserting the coupling part 400 in the 3D printing process, and coupled to the inner panel 130 on the door matching flange side of the body 100, in surface contact with the inner panel 130.

Referring further to FIGS. 5 to 6, when the reinforcing body 200 is manufactured, the coupling part 400, which is a component other than the fastening member 300, may be inserted into the 3D-printer, and then the reinforcing body 200 may be 3D-printed, whereby the coupling part 400 may be integrally formed with the reinforcing body 200, with a portion thereof inserted therein.

This makes it possible that the reinforcing body 200 and the coupling part 400 can be manufactured integrally as a single body so that a very firm connection can be formed. Further, a separate process for coupling the reinforcing body 200 and the coupling part 400 is not additionally required, and thus there is an effect of a reduced number of manufacturing processes.

The coupling part 400 may be coupled to the inner panel 130 on the door matching flange side of the body 100, in surface contact with the inner panel 130. The inner panel 130 may be manufactured as an upper inner panel 131 and a lower inner panel 132, and the ends of the coupling part 400 may be coupled to the upper inner panel 131 and the lower inner panel 132 to connect the upper inner panel 131 and the lower inner panel 132 to each other.

This makes it possible to provide an effect of improving rigidity of the inner panel 130 on the door matching flange side of the body 100.

The coupling part 400 includes a first stepped portion 410 formed such that an end of the coupling part 400 is stepped in a predetermined section and with which the inner panel 130 is in surface contact, and the inner panel 130 has an end provided with a second stepped portion 133 formed to correspond to the first stepped portion 410 so that the assembly position of the inner panel 130 and the coupling part 400 is restricted by surface contact between the first stepped portion 410 and the second stepped portion 133.

The coupling part 400 may have the end coupled to the inner panel 130 and may be provided with the first stepped portion 410 formed stepped at the end thereof. The end of the inner panel 130 may be provided with the second stepped portion 133 formed to correspond to the first stepped portion 410, so that the second stepped portion 133 may be assembled to correspond to the first stepped portion 410 thereby improving accuracy during assembly. The first stepped portion 410 and the second stepped portion 133 may be integrated by a coupling method such as welding the point where the first stepped portion 410 and the second stepped portion 133 are assembled in surface contact with each other.

The present disclosure further includes a weatherstrip 500 for sealing the door matching flange side of the body 100, wherein the weatherstrip 500 is coupled to the inner panel 130 and the coupling part 400.

The first stepped portion 410 may be formed at each of opposite sides of the end of the coupling part 400, and the second stepped portion 133 of the inner panel 130 may be assembled and coupled to the first stepped portion 410, whereby the inner panel 130 and the coupling part 400 may be integrally coupled to each other. The weatherstrip 500 for sealing the door matching flange side of the vehicle may be then provided, and the weatherstrip 500 may be connected to the inner panel 130 and the coupling part 400 integrally coupled to each other, so that there is an effect that the weatherstrip 500 can be mounted to the body 100.

The reinforcing body 200 is provided as a plurality of reinforcing bodies 200 so that the reinforcing bodies 200 are coupled to opposite sides of the body 100, and the body members 110 include a cross member 120 for connecting the reinforcing bodies 200 at opposite sides of the vehicle.

The respective reinforcing bodies 200 may be mounted on opposite pillars of the body 100 so as to be opposed to each other, and the cross member 120 may be formed to extend in the directions of the opposed reinforcing bodies 200 and connect the opposed reinforcing bodies 200 to each other while crossing the center of the vehicle. The cross member 120 has an effect of improving rigidity of the reinforcing bodies 200 by connecting the reinforcing bodies 200 at the opposite sides of the body 100.

In one form, a fastening part 600 is integrally formed with the reinforcing body 200 by inserting the fastening part in the 3D printing process, and the cross member 120 is inserted to the fastening part so that the cross member 120 is coupled to the reinforcing bodies 200 at the opposite sides of the body 100.

Referring further to FIGS. 2 and 4, to couple the cross member 120 connecting the reinforcing bodies 200 located at the opposite sides of the body 100 to the reinforcing bodies 200, the fastening part 600 may be inserted into the 3D-printer together with the fastening member 300 before 3D printing of the reinforcing body 200, and then the reinforcing body 200 may be 3D-printed, whereby the fastening part 600 may be integrally formed with the reinforcing body 200. The fastening part 600 may be coupled to the cross member 120 at a position on the vehicle inner side of the reinforcing body 200.

Although the fastening part 600 is described in a manner in which the cross member 120 is inserted into and coupled to the fastening part 600, the present disclosure is not limited thereto. For example, the fastening part 600 may be formed to protrude from the reinforcing body 200, and the fastening part 600 and the cross member 120 may be coupled by various methods, such as a method in which the fastening part 600 is inserted into and fastened to the cross member 120.

The body members 110 have an extension member 140 branched and extended toward the reinforcing body 200, and the extension member 140 has an extended end fastened to the fastening member 300 and coupled to the reinforcing body 200.

The extension member 140 may be branched and extended toward the reinforcing body 200 from the body member 110, and the end thereof may be coupled to the fastening member 300 of the reinforcing body 200. This makes it possible to improve coupling force between the body member 110 and the reinforcing body 200, and thus there is an effect of improving rigidity of the reinforcing body 200, the body member 110, and the body 100.

The body members 110 includes an upper member 111 extended from the upper side of the body 100 toward the reinforcing body 200, and a lower member 112 extended from the lower side of the body 100 toward the reinforcing body 200.

The body member 110 includes a plurality of upper members 111 formed extended from an upper pillar of the body 100 toward the reinforcing body 200, and a plurality of lower members 112 formed extended from the fender matching flange side of the lower side of the body 100, so that the upper members 111 and the lower members 112 are connected to each other via the reinforcing body 200. This makes it possible to connect the upper and lower sides of the vehicle to each other thereby providing an effect of improving rigidity.

The fastening member 300 includes: an upper fastening member 310 fastened to each of the upper members 111; and a lower fastening member 320 fastened to each of the lower members 112.

The fastening member 300 includes: the upper fastening member 310 inserted in an end of an extended portion 210 extended toward the upper member 111, and having a first end integrated with the reinforcing body 200 and a second end coupled to the upper member 111; and the lower fastening member 320 inserted in an end of an extended portion 210 extended toward the lower member 112, and having a first end integrated with the reinforcing body 200 and a second end coupled to the lower member 112.

This makes it possible that the upper member 111 and the lower member 112 are coupled to the reinforcing body 200, and thus there is an effect of improving the overall rigidity of the body 100.

The 3D-truss structure is a structure in which a plurality of points are connected to each other by a plurality of segments.

Referring further to FIGS. 3 to 4, the 3D-truss structure constituting the reinforcing body 200 is a structure in which connecting the plurality of points with the plurality of segments. This makes it possible to manufacture the reinforcing body 200 by means of 3D printing, to manufacture the reinforcing body 200 in various shapes in a 3D-truss structure, and to reinforce the body 100 at various vehicle positions other than the position as one form of the present disclosure.

The 3D-truss structure is configured such that the length of each of the segments connecting the plurality of points is equal to or less than 10 mm, and the diameter of the segment is equal to or less than 3 mm.

Referring further to FIG. 9, 3D printing technology needs a support when the angle to the stacking direction is equal to or greater than 45°. However, in the 3D-truss structure according to the present disclosure, a printing molding technique that does not require provision of a support is applied by designing the length of the segment to be equal to or less than 10 mm and the diameter of the segment to be equal to or less than 3 mm.

In one form of the present disclosure, the length of the segment is 6 mm, and the diameter of the segment is 1 to 2 mm.

The reinforcing body 200 is configured such that the surface and the inside thereof are formed in a 3D-truss structure connecting the plurality of points with the plurality of segments.

Due to the 3D-truss structure of the surface and the inside of the reinforcing body 200, the reinforcing body 200 has improved rigidity compared to the conventional reinforcing body, thereby having an effect of withstanding the combined load transmitted from the body member 110.

The reinforcing body 200 is applied to the rear pillar of the body 100.

The body reinforcing apparatus for the vehicle according to one form of the present disclosure is manufactured to reinforce the rear pillar side of the body 100, and various forms of the present disclosure are applied to various positions of the body 100 as well as the rear pillar side of the body 100 thereby providing an effect of reinforcing the body 100.

Although the present disclosure has been described in relation to a specific form thereof, those skilled in the art will appreciate that various modifications, additions and substitutions are possible, without departing from the scope and spirit of the present disclosure.

What is claimed is:

1. A body reinforcing apparatus for a vehicle, the body reinforcing apparatus configured to couple body members and provided at a junction where the body members are connected to each other, the body reinforcing apparatus comprising:
    at least one reinforcing body formed in a three-dimensional (3D)-truss structure via a 3D printing process, and having a plurality of extended portions extended toward the body members;
    a fastening member integrally formed with an end of each of extended portions of the plurality of extended portions by inserting the fastening member during the 3D printing process; and
    a coupling part integrally formed with the at least one reinforcing body by inserting the coupling part during the 3D printing process,
    wherein the coupling part forms a surface contact with an inner panel on a door matching flange side of the body,
    wherein the fastening member includes a first end inserted in a corresponding extended portion among the extended portions and integrated with the corresponding extended portion, and a second end fastened to a corresponding body member among the body members.

2. The body reinforcing apparatus of claim 1, wherein the fastening member has a hollow pillar shape such that the first end is inserted in and integrated with the corresponding extended portion during the 3D printing process, and the second end is fastened to the corresponding body member in an insertion manner.

3. The body reinforcing apparatus of claim 2, wherein the first end of the fastening member is inserted in the corresponding extended portion, and the corresponding extended portion is integrated with the first end of the fastening member while surrounding an outer peripheral surface of the first end of the fastening member.

4. The body reinforcing apparatus of claim 1, wherein:
    the coupling part comprises a first stepped portion formed such that an end of the coupling part is stepped in a predetermined section,
    the inner panel forms a surface contact with the first stepped portion, and
    an end of the inner panel has a second stepped portion formed to correspond to the first stepped portion so that an assembly position of the inner panel and the coupling part is restricted by a surface contact between the first stepped portion and the second stepped portion.

5. The body reinforcing apparatus of claim 1, further comprising:
    a weatherstrip configured to seal the door matching flange side of the body,
    wherein the weatherstrip is connected to the inner panel and the coupling part.

6. The body reinforcing apparatus of claim 1, wherein the at least one reinforcing body includes a plurality of reinforcing bodies so that the respective reinforcing bodies are coupled to opposite sides of the body, and
    the body members comprise cross members connecting reinforcing bodies of the plurality of reinforcing bodies to each other on opposite sides of the vehicle.

7. The body reinforcing apparatus of claim 6, further comprising:
    a fastening part integrally formed with a corresponding reinforcing body among the reinforcing bodies by inserting the fastening part during the 3D printing process, wherein a cross member among the cross members is inserted to the fastening part so that the cross member is coupled to the reinforcing bodies one the opposite sides of the body.

8. The body reinforcing apparatus of claim 1, wherein the body members have an extension member branched and extended toward the at least one reinforcing body, and
    the extension member has an extended end fastened to the fastening member and coupled to the at least one reinforcing body.

9. The body reinforcing apparatus of claim 8, wherein the fastening member comprises:
    an upper fastening member fastened to an upper member; and
    a lower fastening member fastened to a lower member.

10. The body reinforcing apparatus of claim 1, wherein the body members include: an upper member extended from an upper side of the body toward the at least one reinforcing body, and a lower member extended from a lower side of the body toward the at least one reinforcing body.

11. The body reinforcing apparatus of claim 1, wherein the 3D-truss structure is a structure in which a plurality of points are connected to each other by a plurality of segments.

12. The body reinforcing apparatus of claim 11, wherein the 3D-truss structure is configured such that a length of each of the plurality of segments connecting the plurality of points is equal to or less than 10 mm, and a diameter of the plurality of segments is equal to or less than 3 mm.

13. The body reinforcing apparatus of claim 11, wherein the at least one reinforcing body is configured such that a surface and an inside thereof are formed in the 3D-truss structure connecting the plurality of points with the plurality of segments.

14. The body reinforcing apparatus of claim 1, wherein the at least one reinforcing body is applied to a rear pillar of the body.

\* \* \* \* \*

UNITED STATES PATENT AND TRADEMARK OFFICE
CERTIFICATE OF CORRECTION

PATENT NO. : 11,345,408 B2
APPLICATION NO. : 17/032864
DATED : May 31, 2022
INVENTOR(S) : Won Ki Song et al.

Page 1 of 1

It is certified that error appears in the above-identified patent and that said Letters Patent is hereby corrected as shown below:

In the Claims

In Column 10, Line 44:
one the opposite sides

Should be replaced with:
on the opposite sides

Signed and Sealed this
Ninth Day of August, 2022

Katherine Kelly Vidal
*Director of the United States Patent and Trademark Office*